July 3, 1956  W. S. ALDRICH  2,752,985
FLYING TAPE SPLICE FOR PRESSURE-SENSITIVE ADHESIVE TAPE
Filed March 26, 1952
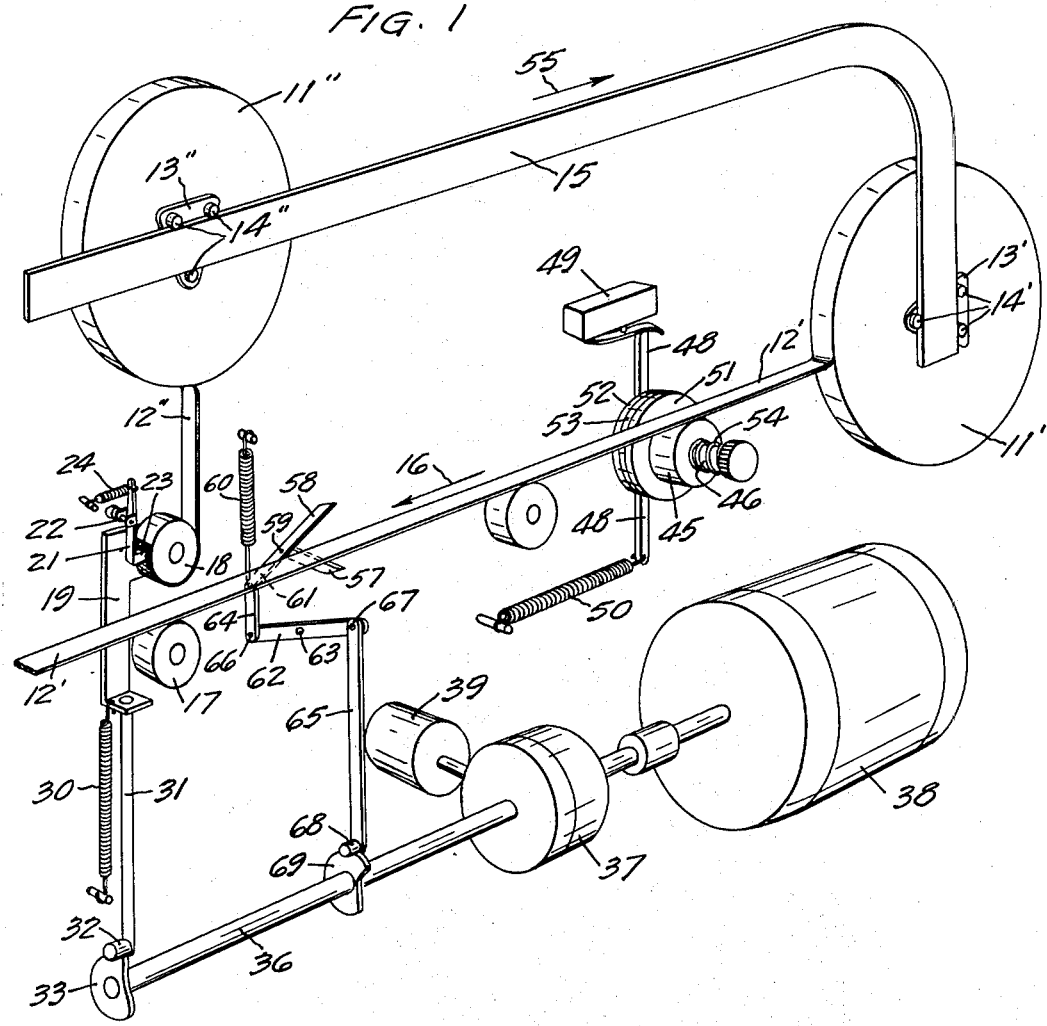
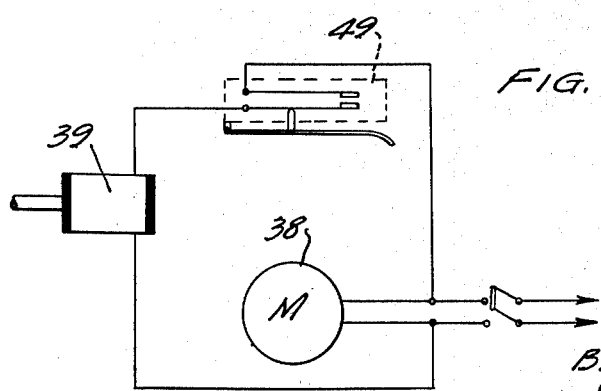
INVENTOR
WALTER S. ALDRICH
BY
ATTORNEYS

United States Patent Office 2,752,985
Patented July 3, 1956

---

2,752,985

FLYING TAPE SPLICE FOR PRESSURE-SENSITIVE ADHESIVE TAPE

Walter S. Aldrich, Moundsview Township, Ramsey County, Minn., assignor to Minnesota Mining & Manufacturing Company, St. Paul, Minn., a corporation of Delaware Application March 26, 1952, Serial No. 278,705

7 Claims. (Cl. 154—42)

This invention relates to the feeding of pressure-sensitive adhesive tape from a supply to a point where the tape is to be used.

Pressure-sensitive adhesive is usually put up in rolls of a given length. If the use to which the tape is being put requires more than the amount of tape that can conveniently be contained in a roll or other batch supply, a fresh supply must be substituted when the first is exhausted. This causes a loss of time, and such losses are costly, particularly where the tape is being used by a continuously operating machine.

An important objective therefore, is to provide a means whereby an exhausted supply of tape can be replaced by a fresh batch or supply in a continuous tape feeding operation without interrupting the feed.

The invention provides a means for splicing the leading end of a fresh or second supply of tape to the trailing end of the exhausted or first supply while the latter is moving from the source to the point of use at its normal speed. A platen is positioned on one side of the path of the moving tape. A movable splicing roller is on the opposite side. The leading end of the tape from the second or replacement supply of tape is temporarily adhered to a holding means adjacent the periphery of the splicing roller. When the first supply is exhausted but before the trailing end thereof passes beyond the splicing roller, the roller is moved into contact with the moving first tape with the held second tape between the two, thereby splicing the two tapes, whereupon the feed continues (now from the second supply) without interruption.

The tape is thus spliced while it is running, and the operation is sometimes referred to as a "flying tape splice."

An illustrative embodiment is described herein and shown in the accompanying drawings in which:

Figure 1 is a diagrammatic showing in perspective of the working parts of a flying tape splicer; and Figure 2 is a wiring diagram.

A supply roll 11' of tape 12' is coated on one side with normally tacky, pressure-sensitive adhesive, is rotatably mounted on a supply carriage 13' which is mounted by means of tracking rollers 14' to travel along a reload track 15.

A length of the tape 12' is withdrawn and conducted from the roll 11', adhesive side down, along a path in the direction of the arrow 16 to where the tape is to be put to use.

At a point somewhat removed from the supply 11', a platen means in the form of a roller 17 is rotatably mounted below the path of the tape 12'. A splicing roller 18 is positioned on the upper or opposite side of the path. The splicing roller is journaled on a carriage 19 which is mounted for vertical reciprocation.

A second or reserve supply roll 11" of tape 12" that is coated on one side with normally tacky, pressure-sensitive adhesive, is rotatably mounted on a second supply carriage 13" which is mounted by means of tracking rollers 14" to travel along the reload track 15.

A length of the second tape 12" is withdrawn, conducted to the splicing roller 18, and trained around the lower periphery thereof, tacky side out, with the leading end extending beyond the point of tangency to the horizontal a distance equal to the space between the peripheries of the splicing roller 18 and the platen roller 17. In the illustrated machine, it extends to the approximate point of tangency to the vertical, i. e., to the nine o'clock position on the roller 18.

An arm 21, pivoted at 22, carries a small holding roller 23 at one end. A spring 24 impels the roller 23 toward the splicing roller 18, to provide a means for releasably holding the tape 12" against the roller 18 until the roller 18 commences its downward movement at the beginning of a splicing operation.

When the first supply roll 11' is exhausted but before the trailing end of the first tape 12' has passed the splicing roller 18, the splicing carriage 19 is moved downwardly by means hereinafter described until the periphery of the splicing roller 18 bears against the first tape 12' with the second tape 12" between them. The said downward movement of the roller 18 unwinds a portion of the tape 12" from it, so that the leading end of the tape 12" will then be approximately at the point of tangency with the horizontal. The exposed outwardly turned tacky side of the second tape 12" adheres to the back of the first tape 12' so that the tapes become spliced, whereupon the tape thenceforth comes from the second supply 11" and the feed or flow of tape to the point of use in the direction of the arrow 16 continues without interruption.

The splicing roller carriage 19 is moved downwardly for the above described splicing operation by a spring 30. A vertical shaft 31 is attached at its upper end to the carriage 19; its lower end carries a cam follower 32 which bears on a cam 33.

The splicing cam 33 is normally motionless with its lobe in contact with the cam follower 32, thereby to hold the shaft 31 up against the pressure of the spring 30 at such a height that the splicing roller 18 is spaced above the platen roller to permit passage of the tape between them. A single revolution of the cam 33 brings its flat side up, permitting the spring 30 to pull the shaft 31 downwardly to lower the splicing roller 18 into splicing position; completion of the revolution returns the lobe of the cam to its said normal position thereby raising the splicing roller in readiness for the next splice.

The cam 33 is fixed on a rotatable horizontal shaft 36 which is turned through a single-revolution clutch 37 by a continuously running motor 38. The clutch is actuated by a solenoid 39. Actuation of the solenoid thus rotates the splicing cam 33 through a single revolution.

To actuate the solenoid upon exhaustion of the first tape supply 11', a trigger roller 45 is journaled on a fixed shaft 46 with the periphery of the roller in contact with the tacky side of the tape 12' at a point between the supply 11' and the splicing roller 18.

A vertical switch arm 48 is journaled at its approximate mid-point on the fixed shaft 46. Above the upper free end of the arm 48 is a normally open switch 49. A spring 50 attached to the lower free end of the arm 48 impels the upper end of the arm clockwise to make momentary contact with the switch 49 as it passes.

A disc 51 is fixed to the end of the trigger roller 45, concentric therewith. A second disc 52 is fixed to the switch arm 48, facing the first disc 51 and concentric therewith. Between the two discs is an oil-soaked felt friction washer 53. The discs are pressed together by a spring 54. The counterclockwise rotation of the trigger roller 45 caused by the running of the tape in adhesive contact therewith in the direction of the arrow 16 is transmitted through the friction washer 53 sufficiently to move the upper end of the arm 48 counterclockwise out of contact with the switch 49 and to hold it there. Thus while the tape 12' is running, the switch 49 remains open. When the supply 11' is exhausted and the trailing end of the tape 12' has passed the trigger roller 45 and is no longer in contact therewith, the counterclockwise pressure on the switch arm 48 ceases, whereupon the arm 48, moved clockwise by the spring 50, closes the switch 49 long enough to actuate the solenoid 39 (Figure 2).

The splicing of the tapes 12' and 12" then takes place, in the manner previously described, and the withdrawal of the tape 12" from the supply 11" commences.

While the second tape 12" is running, the first carriage 13' is manually removed by the operator from the reload track 15 and the second carriage 13" is then moved along the track in the direction of the arrow 55 to the running position previously occupied by the first carriage 13'. A third supply roll of tape is then mounted on the carriage 13', the carriage 13' is placed on the track in the ready position previously occupied by the carriage 13", and a length of tape is withdrawn from the said third roll and trained around the splicing roller 18 with the leading end held in place by the holding roller 23, in readiness for the next cycle.

The trailing end portion of a supply roll of pressure-sensitive adhesive tape, i. e., the portion in immediate contact with the core on which the tape is wound, is frequently unusable; e. g., where the core is of cardboard, the length of tape in contact therewith picks up fibers from the cardboard when removed, and its tack is thereby lessened or destroyed.

It is desirable to cut off such a trailing end portion before a new roll is spliced on, and the invention accordingly provides a tape severing means adjacent the tape path between the trigger means 45 and the splicing roller 18, operating in timed relation to the splicing roller movement.

A fixed shear blade 57 is positioned below the path of the tape 12' between the trigger means 45 and the splicing roller 18. A movable shear blade 58 positioned above the tape path is pivoted to the lower blade at 59 to coact therewith. A spring 60 pulls a rear extension 61 of the blade 58 upwardly to cut the tape.

The extension or end 61 is drawn downwardly by a lever 62 pivoted at 63 and vertical shafts 64 and 65 which are pivoted to the lever at 66 and 67. The upper end of the shaft 64 is attached to the end 61 of the movable blade 58. The lower end of the shaft 65 carries a cam follower 68 which bears on a cam 69 fixed on the cam shaft 36. The shear cam 69 is normally motionless with its lobe in contact with the cam follower 68, thereby to hold the shaft 65 up against the pull of the spring 60 sufficiently to keep the shear 57—58 open.

The previously described single rotation of the cam shaft 36 which turns the splicing cam 33, also turns the shear cam 69 to bring its flattened side up, permitting the spring 60 to close the shear 57—58 and cut the tape; completion of the revolution returns the lobe of the cam to its said normal position, thereby opening the shear in readiness for the next cut.

There are numerous alternatives and equivalents.

The platen means may be a supporting element other than the illustrated roller 17 and/or it need not be positioned directly below the splicing roller 18, as long as it provides a support for the tape 12' when the fresh tape 12" is being pressed into adhesive contact therewith.

Although the position of the illustrated apparatus is such that the normal flow of tape from the supply through the splicing mechanism is in a horizontal plane, the apparatus may be placed in other positions to suit the particular tape-using operation which it may be called upon to serve. The terms "horizontal," "up," "down," "vertical," and the like, as used herein are therefore relative and not limiting.

All embodiments of the invention described and/or claimed herein, are contemplated.

I claim:

1. A flying tape splicing apparatus comprising means for holding a first supply of tape, means for holding a second supply of tape, a platen means on one side of the path of an extended length of tape withdrawn from the first supply, a movable splicing roller on the side of the path opposite the platen means, means for holding the splicing roller normally in spaced relation to the platen means to permit passage of the tape between them, means for moving the splicing roller into contact with the tape with a withdrawn length of tape from the second supply between the periphery of the splicing roller and the first tape, and means for actuating the splicing roller moving means automatically upon exhaustion of the first supply, the said actuating means comprising a trigger roller in peripheral contact with the withdrawn length of first tape, an arm pivoted coaxially with the trigger roller, friction means between the trigger roller and the arm to impel the arm in one direction when the trigger roller is being turned by the moving tape, spring means to impel the arm in the opposite direction upon release of the said contact between the tape and the trigger roller, and a connection between the arm and the splicing roller moving means operative upon movement of the arm in the said opposite direction.

2. A flying tape splicing apparatus for pressure-sensitive adhesive tape comprising means for holding a first supply of tape, means for holding a second supply of tape, a platen means on one side of the path of an extended length of tape withdrawn from the first supply, a movable splicing roller on the opposite side of the path, means for holding a withdrawn length of tape from the second supply in splicing position between the periphery of the splicing roller and the first tape by temporary adherence of the second tape to the said holding means, means for holding the splicing roller normally in spaced relation to the platen means to permit passage of the tapes between them, means for moving the splicing roller into contact with the first tape with the held second tape between the periphery of the splicing roller and the first tape, and means for actuating the splicing roller moving means automatically upon exhaustion of the first supply.

3. The apparatus of claim 2 having a severing means between the said actuating means and the splicing roller operative in timed relation to the movement of the splicing roller for cutting off the trailing end portion of the first tape.

4. The apparatus of claim 2 in which the platen means comprises a roller.

5. The apparatus of claim 2 having spring means for moving the splicing roller.

6. The apparatus of claim 2 in which the said actuating means comprises a trigger in contact with the withdrawn length of the first tape between the splicing roller and the first supply, and a connection between the trigger and the splicing roller moving means operative upon release of the said contact between the tape and the trigger.

7. The apparatus of claim 6 in which the said actuating means comprises a trigger roller in peripheral contact with the withdrawn length of first tape, an arm pivoted coaxially with the trigger roller, friction means between the trigger roller and the arm to impel the arm in one direction when the trigger roller is being turned by the moving tape, spring means to impel the arm in the opposite direction upon release of the said contact between the tape and the trigger roller, and a connection between the arm and the splicing roller moving means operative upon movement of the arm in the said opposite direction.

References Cited in the file of this patent

UNITED STATES PATENTS

| | | |
|---|---|---|
| 1,540,831 | De Moos | June 9, 1925 |
| 1,651,840 | Scott | Dec. 6, 1927 |
| 1,758,176 | Scott | May 13, 1930 |
| 2,094,896 | Knowlton | Oct. 5, 1937 |
| 2,613,042 | Dice, Jr. | Oct. 7, 1952 |

FOREIGN PATENTS

| | | |
|---|---|---|
| 19,883 of 1897 | Great Britain | Aug. 27, 1898. |
| 399,780 | Great Britain | Jan. 7, 1932 |